United States Patent
Mallano (10) Patent No.: US 8,137,008 B1
(45) Date of Patent: Mar. 20, 2012

(54) MOBILE CAMERA MOUNT (76) Inventor: Donato Mallano, Brooklyn, NY (US)

(*) Notice: Subject to any disclaimer, the term of this patent is extended or adjusted under 35 U.S.C. 154(b) by 170 days.

(21) Appl. No.: 12/387,218

(22) Filed: Apr. 29, 2009

Related U.S. Application Data (60) Provisional application No. 61/125,766, filed on Apr. 29, 2008.

(51) Int. Cl.
G03B 17/56 (2006.01)
E04H 12/18 (2006.01)
(52) U.S. Cl. .......................... 396/427; 52/110
(58) Field of Classification Search ............... 396/419, 396/427; 348/118, 148; 52/110
See application file for complete search history.

(56) References Cited

U.S. PATENT DOCUMENTS

| Patent No. | | Date | Inventor | Page |
|---|---|---|---|---|
| 3,638,889 | A * | 2/1972 | Samuelson | 248/206.3 |
| 3,689,695 | A * | 9/1972 | Rosenfield et al. | 348/148 |
| 4,413,451 | A * | 11/1983 | Featherstone et al. | 52/28 |
| 4,593,474 | A * | 6/1986 | Mayhew | 33/264 |
| 5,163,650 | A * | 11/1992 | Adams et al. | 248/405 |
| 5,173,725 | A | 12/1992 | Giles et al. | |
| 5,212,655 | A * | 5/1993 | Boehle | 702/155 |
| 5,260,731 | A | 11/1993 | Baker, Jr. | |
| 5,835,808 | A | 11/1998 | Parker et al. | |
| 5,839,704 | A | 11/1998 | Appleman | |
| 6,056,450 | A | 5/2000 | Walling | |
| 6,196,504 | B1 | 3/2001 | Lemke | |
| 6,244,759 | B1 | 6/2001 | Russo | |
| 6,384,741 | B1 * | 5/2002 | O'Leary, Sr. | 340/937 |
| 6,484,456 | B1 * | 11/2002 | Featherstone et al. | 52/118 |
| 6,582,105 | B1 * | 6/2003 | Christensen | 362/385 |
| 6,698,942 | B2 | 3/2004 | Ward | |
| 7,217,044 | B1 | 5/2007 | Marks, Jr. | |
| 7,448,812 | B2 * | 11/2008 | Heibel | 396/419 |
| 7,497,140 | B2 * | 3/2009 | Blackwelder et al. | 74/89.28 |
| 7,642,899 | B2 * | 1/2010 | Alvarado et al. | 340/425.5 |
| 7,755,668 | B1 * | 7/2010 | Johnston et al. | 348/211.4 |

* cited by examiner

Primary Examiner — Clayton E Laballe
Assistant Examiner — Leon W Rhodes, Jr.
(74) Attorney, Agent, or Firm — Montgomery Patent & Design, LLC; Robert C. Montgomery; Joseph T. Yaksich (57) ABSTRACT A remote-controlled, roof-mounted, digital camera mount for a motor vehicle is herein disclosed. The apparatus comprises a mount system with a remote control. The mount system provides for remote control of pan and tilt functions on the mount. The remote control is provided by two (2) or more electric motors in wireless communication with said remote control located by an operator's position enabling the operator to control the positioning of the camera while operating the camera.

15 Claims, 8 Drawing Sheets

MOBILE CAMERA MOUNT

RELATED APPLICATIONS

The present invention was first described in and claims the benefit of U.S. Provisional Application No. 61/125,766, filed Apr. 29, 2008, the entire disclosures of which are incorporated herein by reference.

FIELD OF THE INVENTION

The present invention relates generally to a camera mount, and more specifically, to camera mount that is mobile and attaches to the roof of a motor vehicle.

BACKGROUND OF THE INVENTION

Remote control cameras are commonly used in situations where a user cannot accompany the camera due to the environment or activity which is being captured. One (1) common situation is for security and monitoring purposes. Nature and landscape photography is also becoming increasingly popular due to the ease of sharing one's photographs over the World Wide Web. With the addition of "street view" to many internet based mapping tools, users can get an on the ground snap shot of an area or even live action of events.

The most common problem encountered during any of these activities is positioning and holding the camera in a desired location. The use of tripods and other stabilization systems have attempted to solve these problems and have greatly increased the use of modern camera systems. U.S. Pat. No. 5,839,704, issued in the name of Appleman, describes a camera support device comprising a vertical rod, a camera mount on the top of the rod, a positioning bracket, an upper support arm having variable length adjustment, and support pad for bracing the device against a user's body to provide stability when using the camera. U.S. Pat. No. 5,260,731, issued in the name of Baker, Jr., describes a camera mount for a vehicle comprising a vehicle door or window mounted camera support bracket having an "L"-shape an cooperating clamping legs that engage the window top or door. Such bases allow the use longer exposure times, a stable camera and perhaps most important, save the user from having to hold the camera at all times.

While there are many mounts available for indoor and security use, the presence of mounts for the motor vehicle is lacking and pictures taken from the inside of a motor vehicle must contend with dirty glass, unfocused pictures, and the like. Attempts to mount cameras to the exterior of vehicles commonly suffer from a lack of superior adjustability and function which are common among stationary camera mounts and inconvenient methods of attaching the camera mount. U.S. Pat. No. 5,835,808, issued in the name of Parker et al., describes a vehicle camera mount that is supported on the exterior of a vehicle door comprising a plurality of vacuum mounts, horizontal supports, and vertical supports and providing a position adjustable camera platform mount that holds the camera while reducing unintended movement of the camera due to the movement of the vehicle. U.S. Pat. No. 6,056,450, issued in the name of Walling, describes a camera support device with telescoping pole comprising a stable support base, a telescoping pole and a tiltable camera mount on the top of the pole and monitor and providing a means to elevate a camera above an operator.

Other the relevant attempts to provide support and mounting devices for cameras include several U.S. Pat. Nos. 5,173,725, issued in the name of Giles et al., which describes a camera mount for a boat; 6,196,504, issued in the name of Lemke, which describes a positive-lock-and-release device for camera mounting; 6,244,759, issued in the name of Russo, which describes an adjustable camera support; 6,698,942, issued in the name of Ward, which describes a camera mount; and 7,217,044, issued in the name of Marks, Jr., which describes a camera system.

While these devices fulfill their respective, particular objectives, each of these references suffers from one (1) or more of the aforementioned disadvantages. Accordingly, there is a need for a means by which a digital camera mount for the exterior of a motor vehicle can be provided which also allows for remote control of the mount. The development of the invention herein described substantially departs from the conventional solutions and in doing so fulfills this need.

SUMMARY OF THE INVENTION

In view of the foregoing references, the inventor recognized the aforementioned inherent problems and observed that there is a need for a digital camera mount for the exterior of a motor vehicle that can provide for the remote control of the mount, remote control of the camera, and remote display of the digital images and thus, the object of the present invention is to solve the aforementioned disadvantages.

To achieve the above objectives, it is an object of the present invention to provide a mobile camera mount for a vehicle that provides a means for assisting in the photographic capture of people, environment, or other objects particularly while a user is within a vehicle.

Another object of the mobile camera mount is to provide an apparatus comprising a mount, a telescopic structural member, a platform, a display, and a control system equipped with a remote control. The apparatus supports various types and styles of cameras which are able to transmit image data and communicate to a remote control or personal computer via Ethernet or Wi-Fi.

Yet still another object of the mobile camera mount is to provide a mount that is easily removably attached or permanently attached to the roof of a vehicle that provides a means to secure the apparatus to the roof and a stable base for the attached camera system while the vehicle is in motion.

Yet still another object of the mobile camera mount is to provide a telescopic structure comprising extending members that provides a means to elevate the camera to a desired level to avoid undesirable obstructions and achieve an aerial-type photograph. The telescopic member is battery powered and motor driven comprising a lead screw and a lead screw motor which provides the height adjustability means for the apparatus.

Yet still another object of the mobile camera mount is to provide a platform that provides a mounting surface to the camera and comprises two (2) motors and two (2) pivoting members which provide a means of lateral and rotational motion to the platform and correspondingly to the camera.

Yet still another object of the mobile camera mount is to provide a wireless remote control that provides a means to control the telescopic structure, the motion of the camera platform, and the activation and functions of the camera system and comprising a display and a plurality of controlling means that will permit the user to operate the apparatus as well as the camera within the vehicle.

Yet still another object of the mobile camera mount is to provide a method of utilizing the apparatus which provides a remote controlled camera mount suitable for the rough service use on the exterior of a motor vehicle.

Further objects and advantages of the mobile camera mount will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 mobile camera mount
20 display
30 remote control
31 button
32 switch
33 knob
34 antenna
40 first mount
41 magnet
42 magnet switch
45 second mount
50 vehicle
60 structural member
61 first extending member
62 second extending member
63 anchoring member
64 protuberance
65 lead screw
66 inside wall
67 lead screw nut
68 lead screw motor
69 circuitry
70 camera
71 battery compartment
71a battery switch
72 battery
73 first motor
73a first motor shaft
74 second motor
74a second motor shaft
75 electrical wiring
76 signal
77 height adjustment knob
80 platform
82 rotating assembly
83 threaded appendage
84 first pivot
85 second pivot
91 microphone
92 spot light
93 loud speaker

DETAILED DESCRIPTION OF THE PREFERRED EMBODIMENT

Figure 6:
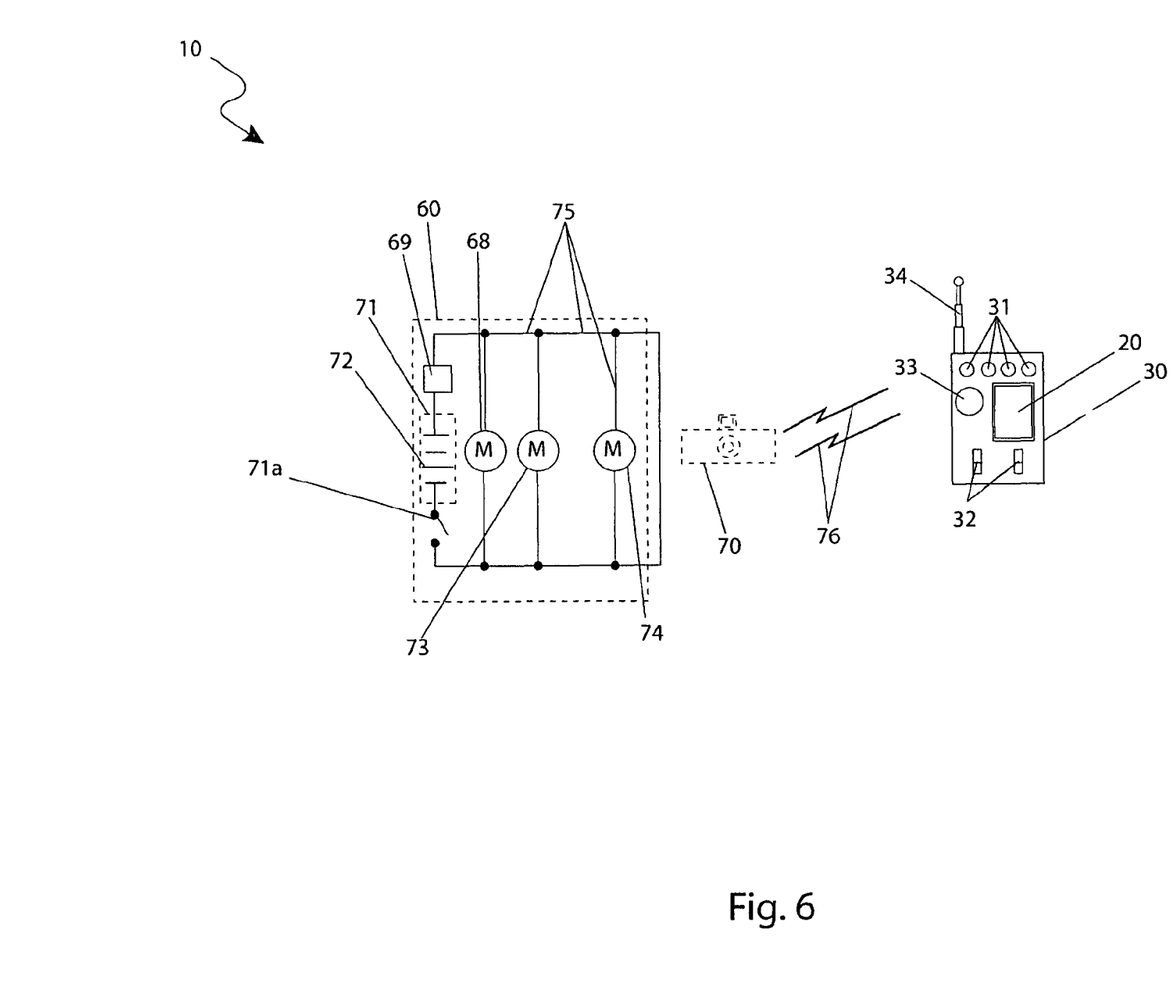
FIG. 6 is an electrical block diagram of the mobile camera mount 10, according to a preferred embodiment of the present invention.
Figure 7:
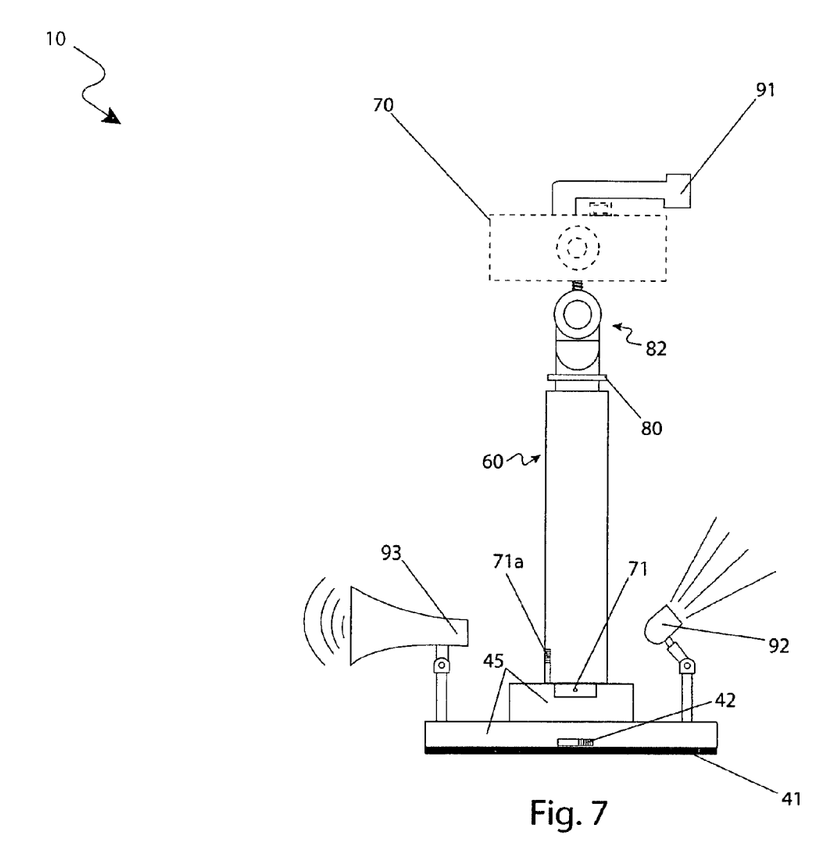
FIG. 7 is a front view of a mobile camera mount depicting additional accessories, according to a preferred embodiment of the present invention; and, FIG. 8 is a front view of an alternate embodiment of the mobile camera mount 10 depicting a height adjustment knob 77, according to an alternate embodiment of the present invention.
Figure 8:
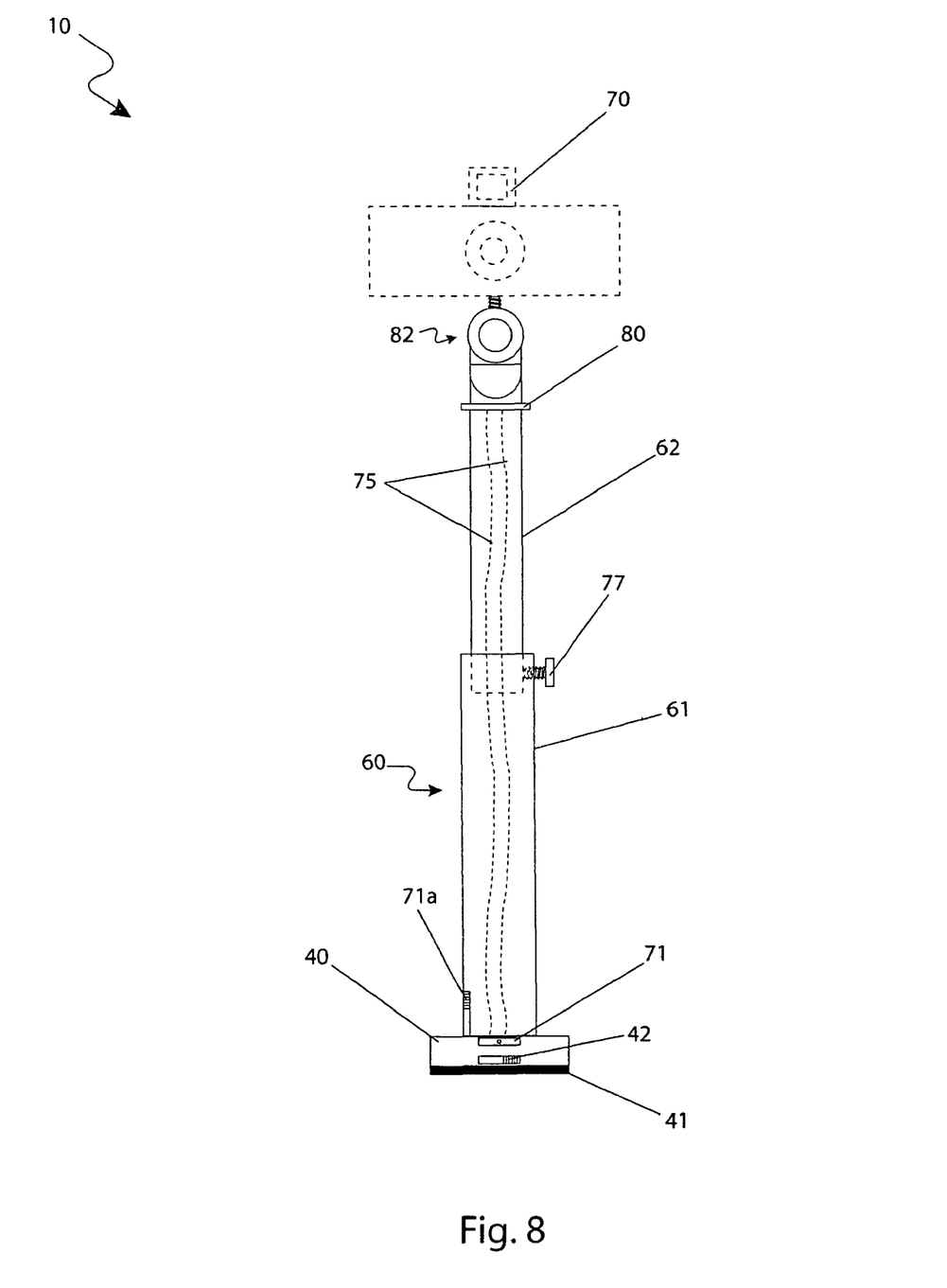

The best mode for carrying out the invention is presented in terms of its preferred embodiment, herein depicted within FIGS. 1 through 7, and in terms of its alternate embodiment in FIG. 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a mobile camera mount (herein described as the "apparatus") 10 for a vehicle 50, which provides a means for assisting in the photogenic capture of people, environmental milieu, and/or other objects as desired, specifically while a user is situated within a vehicle 50. Said apparatus 10 comprises a first mount 40, a telescopic structural member 60, a platform 80, a display 20, and a control system equipped with a remote control 30. Said apparatus 10 is fabricated from materials capable of withstanding the environmental effects such as, but not limited to, rain, heat, cold, snow over an extended period of time. The apparatus 10 is illustrated here being particularly suitable thereto an aftermarket application; however, it is understood that the apparatus 10 may also be introduced as original equipment on popular makes and models of motor vehicles 50. Said apparatus 10 supports cameras 70 such as, but not limited to: wireless digital cameras, video capturing devices or webcam technology, internet protocol (IP) cameras, or closed circuit television cameras all of which are able to transmit image data via Ethernet or Wi-Fi and connects to a remote control 30 or personal computer.

Figure 1:
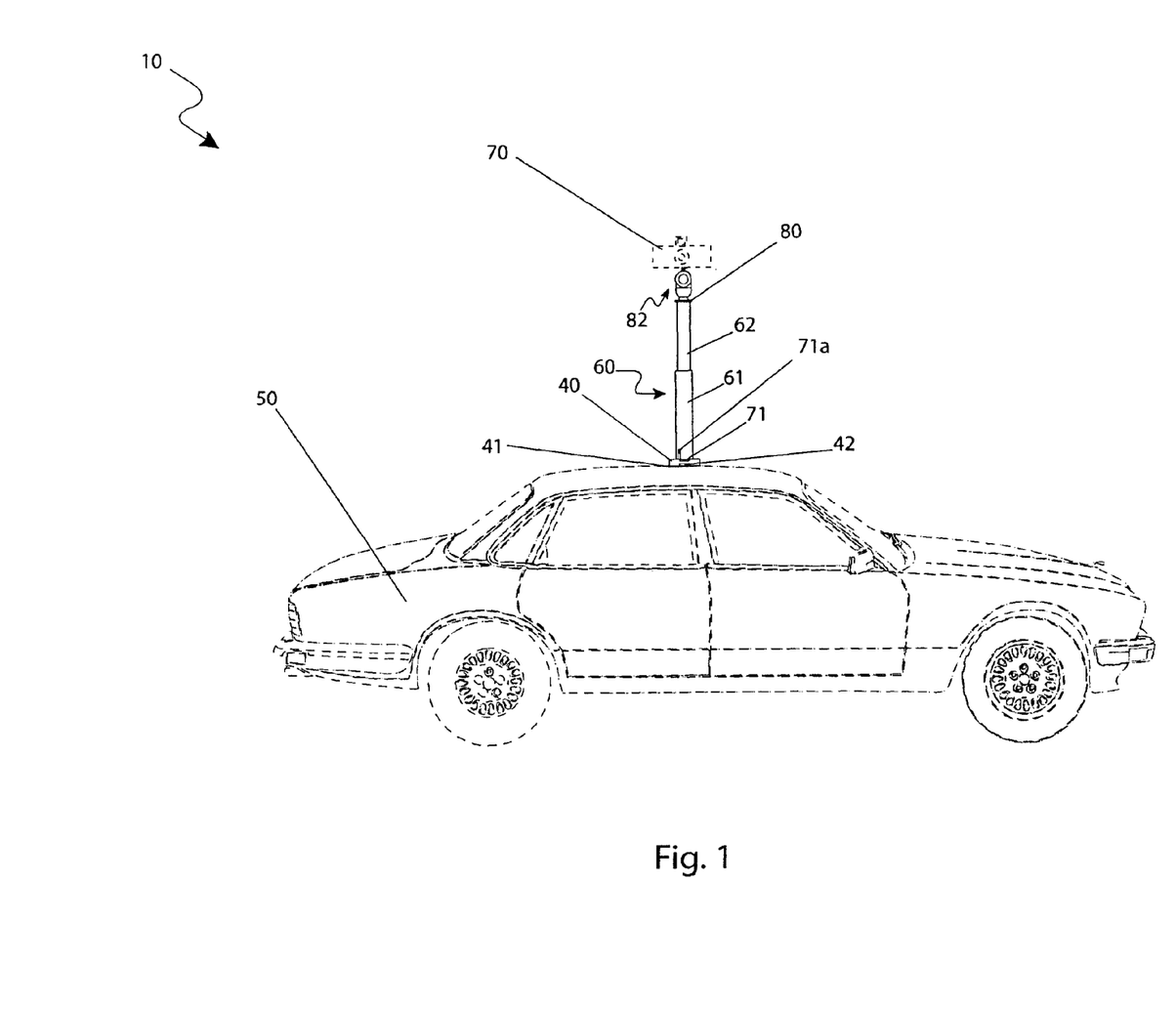
FIG. 1 is front view of a mobile camera mount 10 removably installed thereto a vehicle 50, according to the preferred embodiment of the present invention.

Referring now to FIG. 1, a front view of the apparatus 10 removably installed thereto a vehicle, is disclosed, according to the preferred embodiment of the present invention. The apparatus 10 comprises a rectangular first mount 40 that is temporarily, or alternatively permanently, affixed thereto the roof of a vehicle 50 to support the weight of the apparatus 10 and thus the weight of the camera 70 as well as provide stability particularly when a structural member 60 is in an extended orientation. The first mount 40 is magnetically attached thereto the roof via a magnet 41. The magnet 41 would comprise a significant magnetism force such that wind impelled thereto structural member 60 and camera 70 would not motion said structural member 60 and camera 70 undesirably. The magnet 41 also comprises a magnet switch 42, thereby providing a selectable magnetizing or demagnetizing switching means to said magnet 41. Said magnet switch 42 is a conventional mechanical switch such as, but not limited to: a toggle switch, a slide switch, a push button, or the like. Alternatively, the apparatus 10 may be temporarily affixed thereto the roof of a vehicle 50 by means of latches, fasteners, locking mechanisms, and/or any other temporary means which would securely affix the apparatus 10 thereto the roof of a vehicle 50. To reduce the possibility of marring or scratching the paint of the roof of a vehicle 50 at which the first mount 40 would be secured thereto, a coating and/or a padded surface may be integrally provided thereon at least the bottom surface of said first mount 40 at which will contact the roof of the vehicle 50. The structural member 60 and the first mount 40 are fabricated of steel, stainless steel, aluminum and/or other suitable material, preferably coated with various protective coatings dependent upon the particular material of construction.

Figure 2:
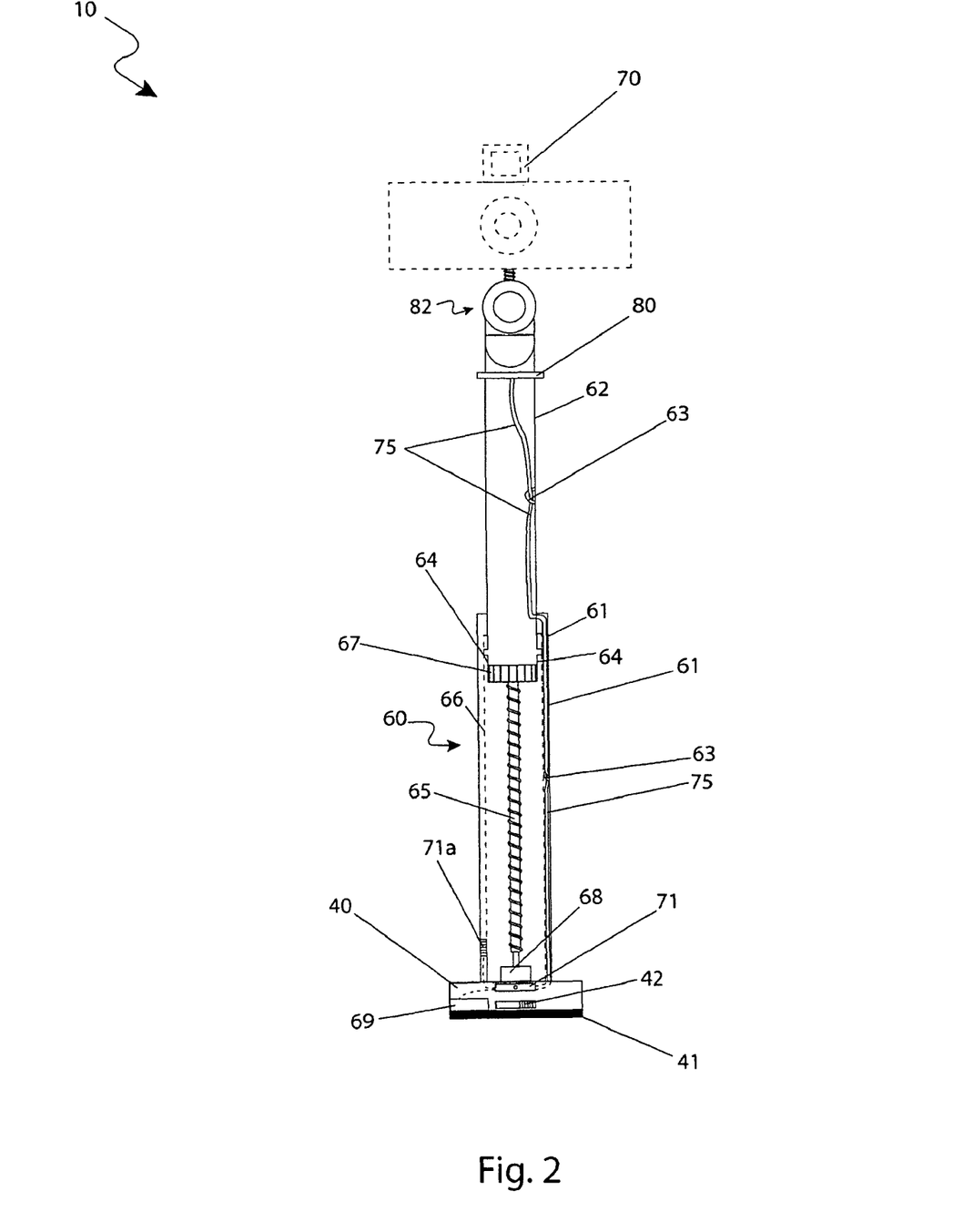
FIG. 2 is partial cut-away view of the mobile camera mount 10, according to the preferred embodiment of the present invention.
Figure 3:
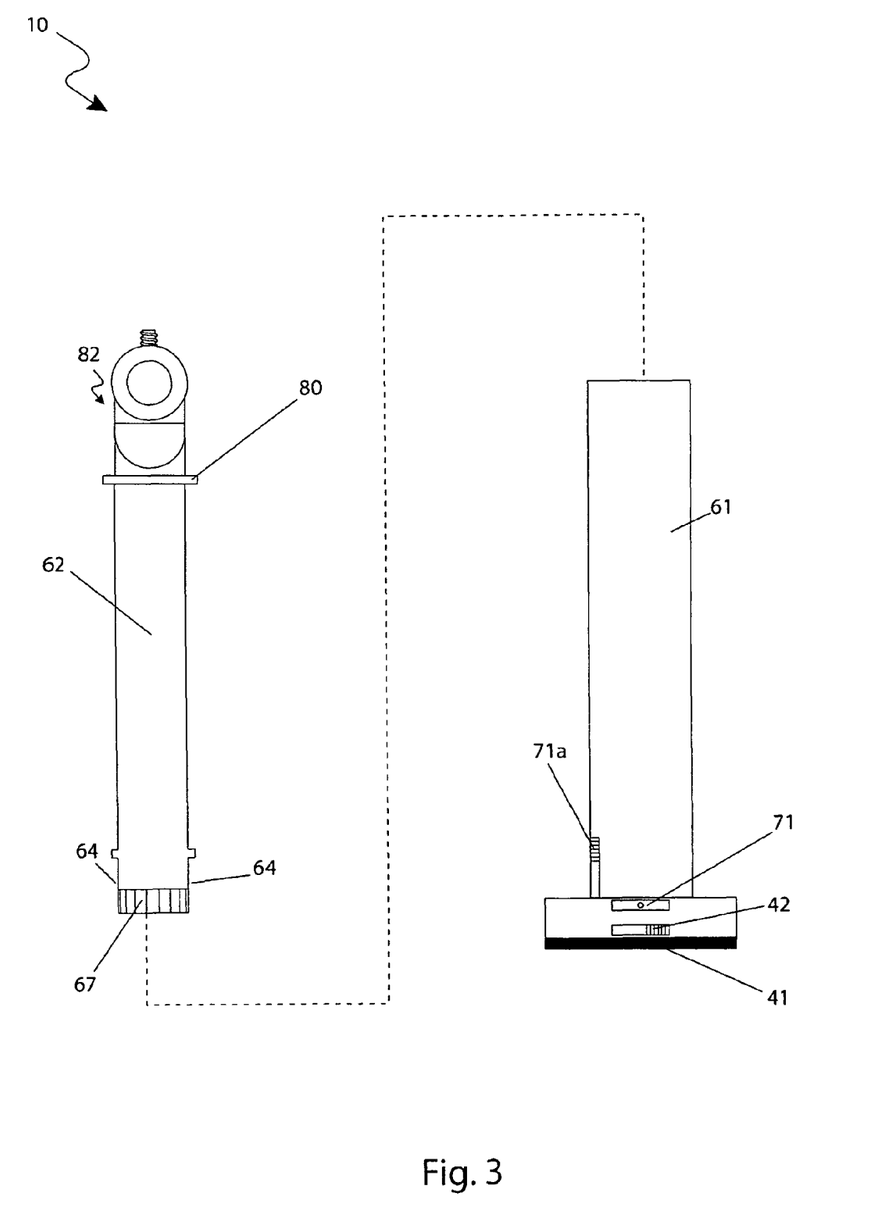
FIG. 3 is an exploded view of the mobile camera mount 10, according to the preferred embodiment of the present invention.
Figures 4A, 4B, 4C:
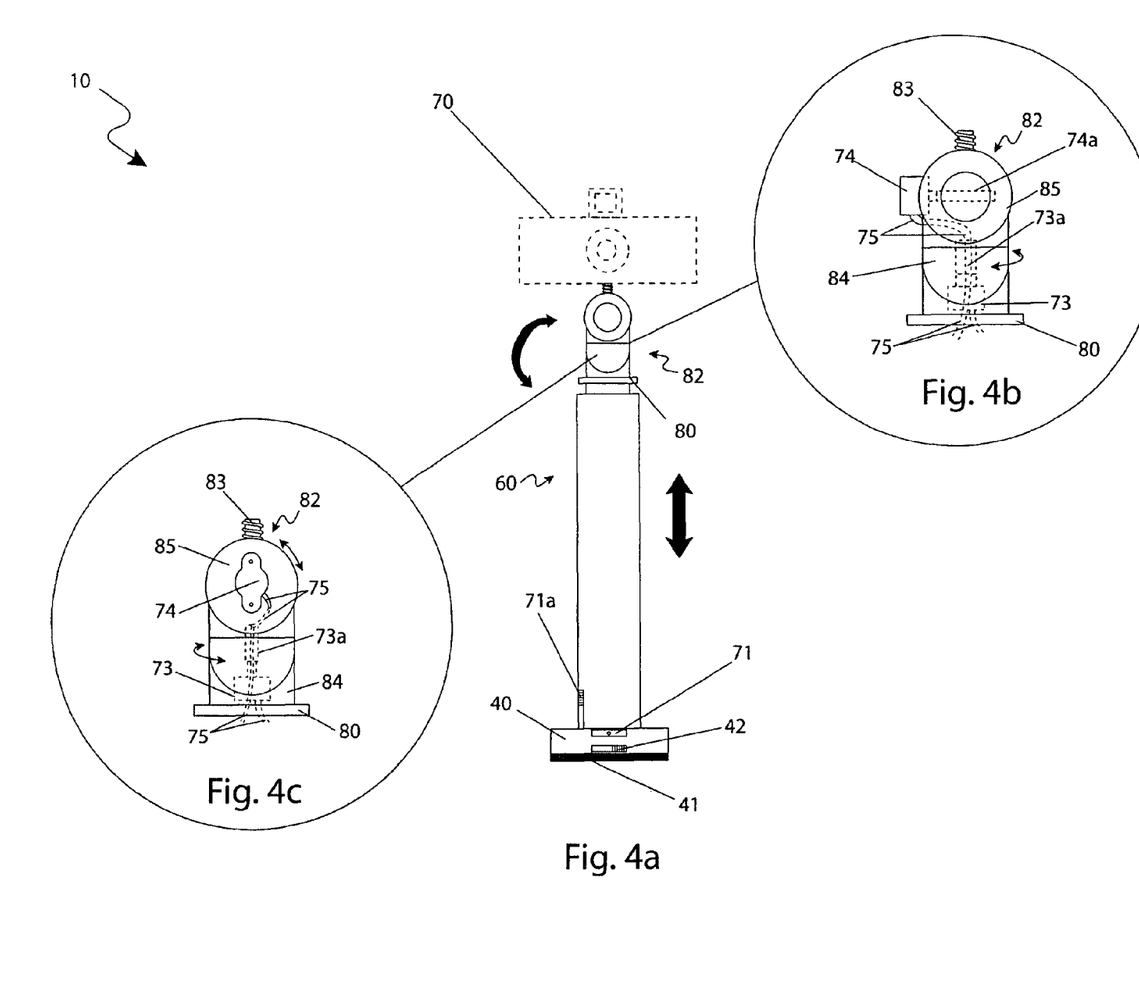
FIG. 4a is front view of a mobile camera mount 10, according to the preferred embodiment of the present invention.
FIG. 4b is a close-up front view of a rotating assembly 82 depicting internal components, according to the preferred embodiment of the present invention.
FIG. 4c is a close-up side view of a rotating assembly 82 depicting internal components, according to the preferred embodiment of the present invention.

Referring now to FIG. 2, a partial cut-away view of the apparatus 10 and FIG. 3, an exploded view of the apparatus 10, are disclosed, according to the preferred embodiment of the present invention. Attached perpendicularly thereto the first mount 40 is a structural member 60 comprising at least two (2) extending members: a first extending member 61 and a second extending member 62. The telescopic structure member 60 allows placement of a camera 70 above the view of the vehicle 50 or other undesirable object directly in front. In addition, it also allows aerial shots of people, objects, environmental effects, and/or other desirable photogenic matter. The extending members 61, 62 comprise a means at which the structural member 60 may be telescopically extended thereto an approximate length of four (4) feet, as depicted in FIG. 1, and retracted to a length of approximately two (2) feet, as depicted in FIG. 4a, as desired. The structural member 60 has a circular cross-sectional area that is hollow in a tubular form with each member slightly smaller than the previous to enable each member to be slidably received therewithin one (1) another and optionally extended outward therefrom to vary the overall length of the structural member 60. The cross-sectional area of the second extending member 62 is slightly smaller than that of the cross-sectional area of the first extending member 61. The second extending member 62 may be permanently, or alternatively, temporarily, inserted therein one (1) end of the first extending member 61 to extend outwardly at the distal end as desired. The second extending member 62 is sized to correspondingly be inserted therewithin the first extending member 61 such that the inside walls of the first extending member 61 uniformly abuts against the outside walls of the second extending member 62.

The structural member 60 comprises a plurality of lockstop positions which would allow intermediate extensions or retractions of said structural member 60 to a desired height, thereby not limiting said structural member 60 to stopping at the length of the first 61 or second 62 extending members. Said extension or retraction means of the structural member 60 comprises a lead screw 65, lead screw nut 67, and lead screw motor 68. Said lead screw motor 68 is located at an internal bottom portion of the first extending member 61, thereby providing a rotational movement to the attached lead screw 65. Said lead screw is a conventional square-toothed precision lead screw which rotates a lead screw nut 67 when the lead screw motor 71 is operational, thereby extending or retracting the second extending member 62. As the lead screw motor 71 rotates the lead screw nut 67 travels upwardly or downwardly thereon the lead screw 65 which in turn extends or retracts the second extending member 62 which further extends or retracts the attached camera 70. Said lead screw nut 67 is attached to a bottom distal portion of the second extending member 62 and threadably engages the lead screw 65. The lead screw motor 68 is controlled via a remote control 30 (see FIG. 5) and internal circuitry 69.

An inside wall 66 of the first extending member 61 guides the lead screw nut 67 and second extending member 62 during the raising or lowering of the structural member 60. A pair of protuberances 64 is located thereabove the lead screw nut 67 thereon the second extending member 62, thereby providing a boundary for said second extending member 62 to travel and prohibiting an accidental removal of said second extending member 62 from the first extending member.

A pair of anchoring members 63 is preferably located thereon internal walls of the first and second extending members 61, 62, thereby securing and guiding electrical wire 75 to the sides of said extending members 61, 62 there as to prohibit twisting or knotting of utilized electrical wires 75.

Referring now to FIG. 4a through 4c, a front view of the apparatus 10, a close-up front view of a rotating assembly 82, and a close-up side view of the rotating assembly 82, respectively, are disclosed, according to the preferred embodiment of the present invention. A digital camera 70 is motionally attached thereto the telescoping structural member 60 and originally rests in a straightforward manner thereon the rotating assembly 82. The structural member 60 and rotating assembly 82 provides support for the camera 70, thereby maintaining the upright position of said camera 70. Said rotating assembly 82 is attached thereto the distal end of the second extending member 62, thereby providing a motional connection point in which the camera 70 is mounted thereto.

The camera 70 is mounted thereto a rectangular platform 80 which motions, pivots, and rotates about the distal end of the second extending member 62. Said platform 80 comprises a rotating assembly 82 which further comprises a threaded appendage 83, a pair of pivoting members 84, 85, and a pair of motors 73, 74. Said rotating assembly 82 is preferably fabricated from a plastic in an injection molding process. The threaded appendage 83 enables the camera 70 to be removably fastened thereto the platform 80 via conventional threading means. Other fastening means may also be utilized to fasten the camera 70 thereto the platform 80 which would permit the camera 70 to sustainly be operationally mounted thereto. Such fastening means may comprise, but is not limited to: latches, links, fasteners, or locking mechanisms. Said threaded appendage is located thereon an uppermost portion of the rotating assembly 82.

The motion of the camera 70 is controlled by at least two (2) motors 73, 74, actuators, or the like which manipulate the platform 80 to gain the desirable view, thereby receiving input by the user via a wireless remote control 30 (see FIG. 5) or personal computer. The control of the motors 73, 74 is initiated thereby said remote control 30 which is thus installed therewithin the vehicle 50 in an arm's reach of the operator and/or passengers. The motors 73, 74 permit motions about the longitudinal axis of the structural member 60. Thus by using the motors 73, 74, the platform 80 may be able to pivot frontwardly or backwardly, tilt sidewardly, rotate about the longitudinal axis of the structural member 60, and/or yaw sidewardly as desired by the operator. The pair of pivoting members 84, 85 provides a multidirectional manipulator with integral rotating means, thereby allowing the camera 70 to pivot in virtually any position as abovementioned. The first pivot 84 enables the camera 70 to be positioned along the longitudinal axis and pivot forwardly or backwardly, thereby rotating to the left or right directions. Said first pivot 84 is controlled with an internally positioned first motor 73 rotating along a first motor shaft 73a which in turn causes the first pivot 84 to rotate. The second pivot 85 enables the camera 70 to be tilted sidewardly, and/or yaw sidewardly positioned along a Y-axis, thereby rotating up or down. Said second pivot 85 is controlled with a partially internally positioned second motor 74 rotating along a second motor shaft 74a which causes the second pivot 85 to rotate. Each motor 73, 74 is interconnected therewith electrical wiring 75 to an appropriately sized battery 72 which is accessed via a battery compartment 71 oriented thereon a lower portion of the structural member 60. Said battery 72 is controlled therewith an on/off battery switch 71a which is located superjacent to the battery compartment 71 and comprised of switching devices such as, but not limited to: a slide switch, a pushbutton, a toggle switch, or the like. Control of the motors 73, 74 may be accomplished alternately using common electrical wiring 75 originating therefrom the remote control system 30 and extending therethrough the hollow center of the telescopic structural member 60 to the motors 73, 74, thereby tethering the remote control 30 to the exterior portion of the apparatus 10.

Alternatively, the platform 80 may comprise a waterproof housing which would be transparent and would removably receive a camera 70 of various designs in which could then be later closed thereby securing the camera 70 within. The housing would thus be removably attached thereto the structural member 60 and would be transparent such to allow a clear view for the operator to capture a picture. The housing would also serve as an atmospheric barrier to prevent damage obliged thereto such as, but not limited to, moisture, heat, and cold as well as prevent damage from airborne objects, i.e. rocks.

Figure 5:
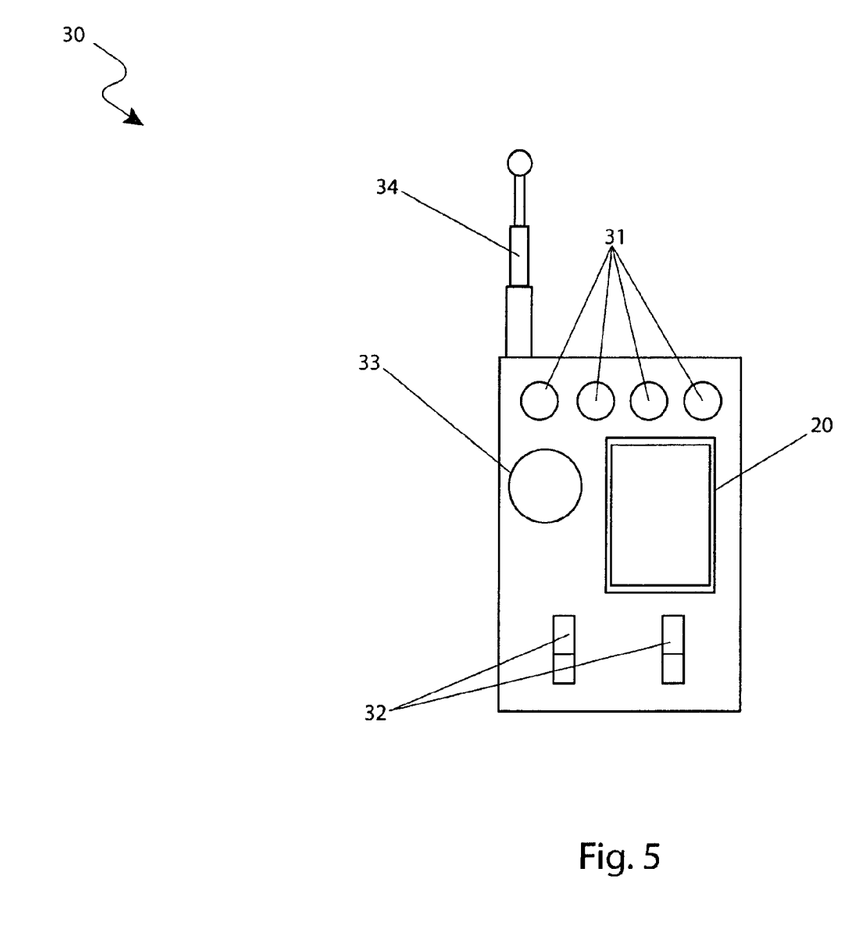
FIG. 5 is front view of a remote control 30, according to the preferred embodiment of the present invention.

Referring now to FIG. 5, a front view of a remote control 30, according to the preferred embodiment of the present invention, is disclosed. A wireless remote control 30 is preferably provided as part of the apparatus 10, thereby controlling the structural member 60 and rotating assembly 82, yet other means of directing the apparatus 10 may be provided such as using a personal computer with properly loaded specific software. The wireless remote control 30 comprises a display 20, a plurality of buttons 31, a pair of switches 32, a knob 33, an antenna 34, and/or other controlling means that will permit the user to operate the apparatus 10 as well as the camera 70 within the vehicle 50. Said remote control 30 provides an electronic device to control the operation of the apparatus 10. The remote control 30 is preferably mounted within the vehicle 50 within an arm's distance of the operator and/or passenger to adjust the angle of the camera 70 at which it is being displayed, perform zoom in/out functions, as well as snap pictures whenever so desired. The antenna 34 provides a means to transmit and receive infrared signals or radio signals to or from the camera 70 similar thereto conventional antennas 34. The display 20 and various control enclosures would also be made of plastic in an injection molding process and powered with a user replaceable battery preferably located thereon a rear portion of the remote control 30 (not pictured).

The display 20 is utilized for monitoring the field of view captured by the camera device 70. The field of view is controlled via a remote control 30 that sends a signal 76 upon user manipulation. The direction the camera 70 is aimed may be relayed thereto the display 20 located along a front surface of the remote control 30 that is in eyesight of the operator and/or passenger of said vehicle 50. The display 20 is preferably a liquid crystal display (LCD), yet other displaying devices may be utilized without limiting the functions of the apparatus 10. To change the position of the camera 70, which in turn changes the view of the display 20, the user may utilize the buttons 31, switches 32, or knob 33. The buttons 31 may incorporate features such as, but not limited to: capture a picture, camera 70 effects, timer settings, or the like. The switches 32 may incorporate features such as, but not limited to: ON/OFF, controlling the lead screw motor 68, first motor 73, controlling the second motor 74, or the like. The knob 33 may incorporate features such as, but not limited to: zoom-in, zoom-out, pan, tilt, or the like.

Referring now to FIG. 6, an electrical block diagram of the apparatus 10, according to the preferred embodiment of the present invention, is disclosed. Said apparatus 10 is powered therewith a user replaceable battery 72 located therein the battery compartment 71 which is internally interconnected thereto the lead screw motor 68, circuitry 69, first motor 73, and second motor 74 via electrical wiring 75. The battery 72 is selectively positioned on or off therewith the battery switch 71a. The lead screw motor 68 controls the height of the structural member 60 and the first and second motors 73, 74 are utilized to position the camera 70. Each motor 68, 73, 74 are controlled via the remote control 30 which transmits a signal 76 to the circuitry 69. The camera 70 also transmits a signal 76 which incorporates image data and control signals to the remote control 30 via the antenna 34. The remote control 30 further transmits data to the camera 70 via the antenna 34 thereto modify the cameras 70 sight-of-view or other associated effects as above-mentioned.

Referring now to FIG. 7, a front view of the apparatus 10 depicting additional accessories, according to a preferred embodiment of the present invention, is disclosed. The apparatus 10 is illustrated here providing an attachment means thereto a variety of accessories such as, but limited to: a microphone 91, a spot light 92, and a loud speaker 93. The enhanced features 91, 92, 93 provide expanded photographic usefulness of the apparatus 10 suitable thereto different sound, lighting, and application requirements. The enhanced features 91, 92, 93 are affixed thereto a second mount 45 via flexible attachment means such as threaded fixtures, locking collars, or other common attachment means. The second mount 45 comprises a large rectangular base made using similar materials as the first mount 40; however, said second mount 45 comprises a larger upper surface area for placement of the enhanced features 91, 92, 93. Said enhancements 91, 92, 93 further comprise rotational and pivoting mechanisms providing a directional adjustment means thereto the operator.

Referring now to FIG. 8, a front view of an alternate embodiment of the apparatus 10 depicting a height adjustment knob 77, according to the preferred embodiment of the present invention, is disclosed. The apparatus 10 may alternately incorporate a manual adjustment device to raise and lower the structural member 60. Each extending member 61, 62 would be manually locked into position therewith an associated conventional height adjustment knob 77 such as, but not limited to: a threaded knob, a clamp, or the like. Said height adjustment knob 77 engages a predrilled aperture (not shown) located on an upper side portion of the first extending member 61 and is then rotated to tighten onto the second extending member 62. Said height adjustment knob 77 is fabricated from similar materials as the structural member 60. The extending members 61, 62 are interconnected and sealed so that they form a substantially single unit that can be extended for a longer length or retracted for a shorter length with seals interconnecting each member therewith one (1) another. The seal restricts access to moisture, dirt, and other undesirables from gaining access thereto the hollow center of the structural member 60.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 through 8.

The method of utilizing the apparatus 10 may be achieved by performing the following steps: acquiring the apparatus 10; securing a camera 70 or the like thereto the threaded appendage 83 located thereon the uppermost portion of the rotating assembly 82; placing the apparatus 10 on a desired located on the roof of a vehicle 50; placing the first mount 40 downwardly thereon said roof of a vehicle 50 at a desired position; positioning the magnet switch 42 to an on position, thereby securing said first mount 40 via a magnet 41 thereto the vehicle 50; positioning the battery switch 71a to an on position; activating the remote control 30 to perceivably witness what is currently being displayed therethrough the lens of said camera 70 using the display 20; positioning the extending members 61, 62 to a desired height via the remote control 30, lead screw 65, and lead screw motor 68; utilizing the remote control 30 to send a plurality of control signals 76 to the internal circuitry 69, thereby motioning the camera 70 to a desired angle as well as obtain the desired zoom, angle, tilt, or the like; utilizing the remote control 30 to snap pictures as desired; and, capturing relatively difficult pictures in the convenience of a vehicle 50.

Additionally, utilization of the enhanced features as depicted in FIG. 6 may be accomplished by attaching one (1) or more features such as a microphone 91, a spot light 92, a loud speaker 93, or the like, based upon requirements of a particular photographic or video scenario thereupon the second mount 45.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A mobile camera mount for supporting a camera above a roof of a vehicle and thereby permitting a user to capture images from the vehicle roof while the user is situated within the vehicle, said mobile camera mount comprising:
    a first mount adapted to be affixed to the vehicle roof;
    a telescoping structural member attached to the first mount and extending upwardly therefrom; and,
    a rotating assembly motionally attached to said telescoping structural member, wherein said rotating assembly further comprises:
        a platform connected to said telescoping structural member;
        a plurality of multidirectional pivoting members connected to said platform; and,
        a threaded appendage attached to one of said pivoting members and being adapted to receive the camera;
    wherein said threaded appendage is pivoted along forward and backward directions as well as being rotated about a longitudinal axis of said telescoping structural member, said threaded appendage further being tilted along a sideward direction relative to the longitudinal axis;
    wherein said rotating assembly further comprises a height adjustment knob to raise and lower said telescoping structural member, said height adjustment knob engaging a first extending member of said telescoping structural member and a second extending member of said telescoping structural member; and,
    wherein said height adjustment knob is registered orthogonal to said first and second extending members, wherein said height adjustment knob passes through an outer surface of said first extending member and remains located exterior of said second extending member.

2. The mobile camera mount of claim 1, wherein a first one (1) of said pivoting members is positioned along the longitudinal axis and thereby pivots along said forward and backward directions as well as being rotated in left and right directions about the longitudinal axis.

3. The mobile camera mount of claim 2, wherein a second one (1) of said pivoting members is tilted sidewardly as well as being rotated up and down about a Y-axis.

4. The mobile camera mount of claim 3, wherein said rotating assembly further comprises:
    a plurality of motors communicatively coupled to said pivoting members respectively; and,
    a remote control communicatively coupled to said motors;
    wherein a first one (1) of said motors comprises a first motor shaft connected to said first pivoting member;
    wherein a second one (1) of said motors comprises a second motor shaft connected to said second pivoting member.

5. The mobile camera mount of claim 4, wherein said telescoping structural member further comprises:
    a lead screw motor and a lead screw coupled thereto; and,
    a lead screw nut concentrically mated to said lead screw and being linearly reciprocated along a longitudinal length of said lead screw as said lead screw motor is operating, said lead screw nut further being attached to a bottom distal portion of said second extending member;
    wherein said lead screw motor is located at an internal bottom portion of said first extending member and thereby provides a rotational movement to said lead screw, said lead screw rotating said lead screw nut when said lead screw motor is operational and thereby extending and retracting said second extending member along a linear path.

6. The mobile camera mount of claim 5, wherein said telescoping structural member further comprises:
    a plurality of protuberances located above said lead screw nut and located on said second extending member, said protuberances providing a boundary for said second extending member to travel and thereby prohibit removal of said second extending member from said first extending member.

7. The mobile camera mount of claim 1, further comprising:
a second mount attached to said first mount; and,
at least one (1) of a microphone, a spot light, and a loud speaker support by said second mount.

8. A mobile camera mount for supporting a camera above a roof of a vehicle and thereby permitting a user to capture images from the vehicle roof while the user is situated within the vehicle, said mobile camera mount comprising:
a first mount adapted to be affixed to the vehicle roof;
a telescoping structural member attached to the first mount and extending upwardly therefrom;
a rotating assembly motionally attached to said telescoping structural member, wherein said rotating assembly further comprises:
a platform connected to said telescoping structural member;
a plurality of multidirectional pivoting members connected to said platform; and,
a threaded appendage attached to one (1) of said pivoting members and being adapted to receive the camera;
wherein said threaded appendage is pivoted along forward and backward directions as well as being rotated about a longitudinal axis of said telescoping structural member, said threaded appendage further being tilted along a sideward direction relative to the longitudinal axis; and,
a display adapted to be communicatively coupled to the camera for permitting the user to view the captured images from within the vehicle;
wherein said rotating assembly further comprises a height adjustment knob to raise and lower said telescoping structural member, said height adjustment knob engaging a first extending member of said telescoping structural member and a second extending member of said telescoping structural member; and,
wherein said height adjustment knob is registered orthogonal to said first and second extending members, wherein said height adjustment knob passes through an outer surface of said first extending member and remains located exterior of said second extending member.

9. The mobile camera mount of claim 8, wherein a first one (1) of said pivoting members is positioned along the longitudinal axis and thereby pivots along said forward and backward directions as well as being rotated in left and right directions about the longitudinal axis.

10. The mobile camera mount of claim 9, wherein a second one (1) of said pivoting members is tilted sidewardly as well as being rotated up and down about a Y-axis.

11. The mobile camera mount of claim 10, wherein said rotating assembly further comprises:
a plurality of motors communicatively coupled to said pivoting members respectively; and,
a remote control communicatively coupled to said motors;
wherein a first one (1) of said motors comprises a first motor shaft connected to said first pivoting member;
wherein a second one (1) of said motors comprises a second motor shaft connected to said second pivoting member.

12. The mobile camera mount of claim 11, wherein said telescoping structural member further comprises:
a lead screw motor and a lead screw coupled thereto; and,
a lead screw nut concentrically mated to said lead screw and being linearly reciprocated along a longitudinal length of said lead screw as said lead screw motor is operating, said lead screw nut further being attached to a bottom distal portion of said second extending member;
wherein said lead screw motor is located at an internal bottom portion of said first extending member and thereby provides a rotational movement to said lead screw, said lead screw rotating said lead screw nut when said lead screw motor is operational and thereby extending and retracting said second extending member along a linear path.

13. The mobile camera mount of claim 12, wherein said telescoping structural member further comprises:
a plurality of protuberances located above said lead screw nut and located on said second extending member, said protuberances providing a boundary for said second extending member to travel and thereby prohibits removal of said second extending member from said first extending member.

14. The mobile camera mount of claim 8, further comprising:
a second mount attached to said first mount; and,
at least one (1) of a microphone, a spot light, and a loud speaker support by said second mount.

15. A method of utilizing a mounted camera mount for capturing images during driving conditions, said mobile camera mount including a first mount adapted to be affixed to the vehicle roof, a telescoping structural member attached to the first mount and extending upwardly therefrom, a rotating assembly motionally attached to said telescoping structural member, wherein said rotating assembly includes a platform connected to said telescoping structural member, a plurality of multidirectional pivoting members connected to said platform, and a threaded appendage attached to one (1) of said pivoting members and being adapted to receive the camera, wherein said threaded appendage is pivoted along forward and backward directions as well as being rotated about a longitudinal axis of said telescoping structural member, said threaded appendage further being tilted along a sideward direction relative to the longitudinal axis; and a display adapted to be communicatively coupled to the camera for permitting the user to view the captured images from within the vehicle, said method comprising the chronological steps of:
acquiring said mobile camera mount;
securing the camera to said threaded appendage located on an uppermost portion of said rotating assembly;
placing said mobile camera mount on a desired located on the vehicle roof;
placing said first mount downwardly on the vehicle roof at a desired position;
obtaining a remote control that is communicatively coupled to said telescoping structural member;
positioning first and second extending members of said telescoping structural member to a desired height via said remote control; and,
motioning the camera to a desired angle and a desired zoom and a desired tilt as desired.

* * * * *